April 21, 1959     E. N. PENNINGTON ET AL     2,883,271
SAFETY SYSTEM FOR COMBUSTION PROCESS
Filed Nov. 23, 1956
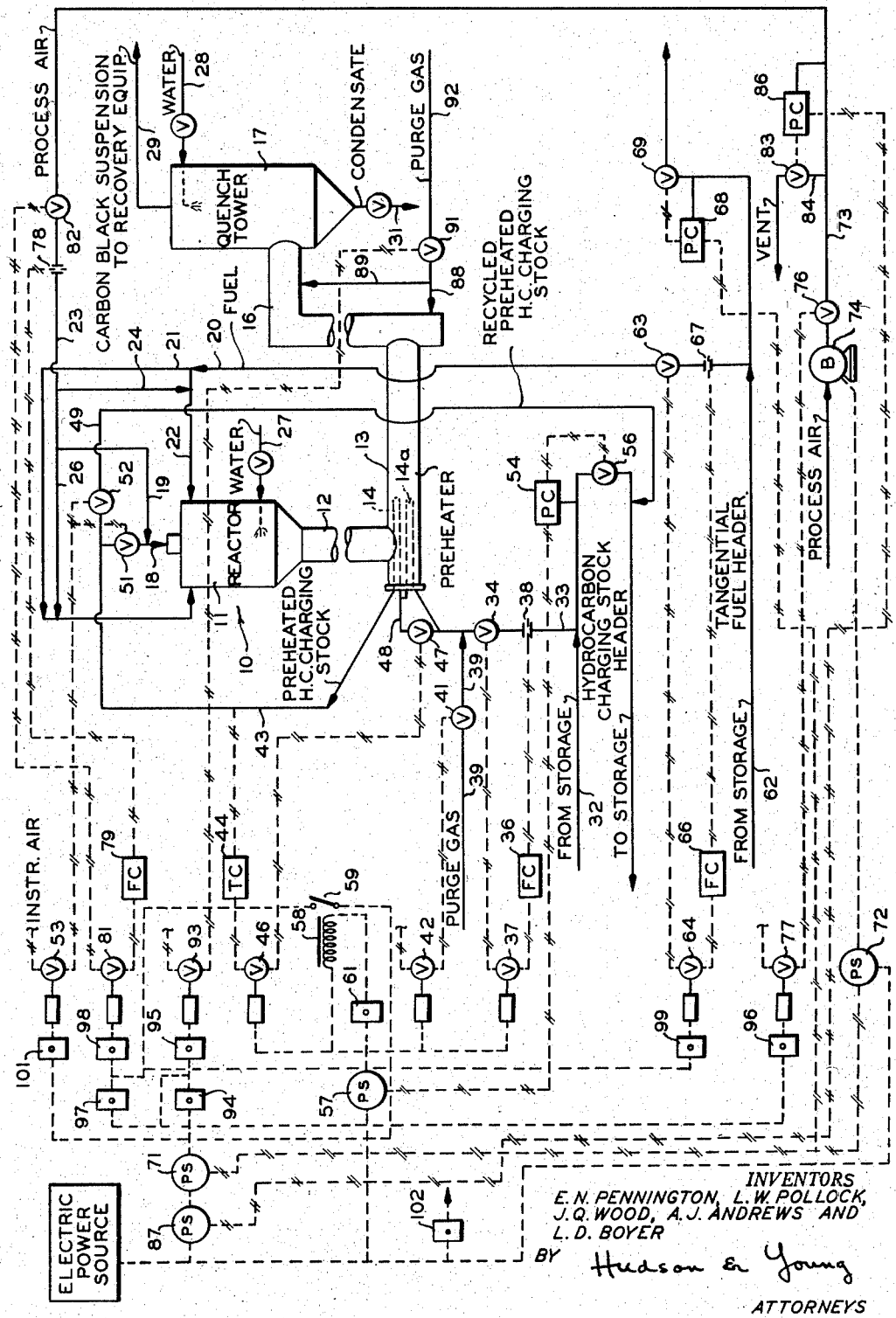
INVENTORS
E. N. PENNINGTON, L. W. POLLOCK,
J. Q. WOOD, A. J. ANDREWS AND
L. D. BOYER
BY Hudson & Young
ATTORNEYS United States Patent Office 2,883,271
Patented Apr. 21, 1959

2,883,271

SAFETY SYSTEM FOR COMBUSTION PROCESS

Edward N. Pennington, Lyle W. Pollock, James Q. Wood, and Alvin J. Andrews, Bartlesville, and Lyndon D. Boyer, Norman, Okla., assignors to Phillips Petroleum Company, a corporation of Delaware Application November 23, 1956, Serial No. 623,973

17 Claims. (Cl. 23—259.5)

This invention relates to a safety system for use in processes involving the burning of combustible mixtures. More particularly, it relates to an automatic safety shut-down system for use in a carbon black process whereby failures of electric power, process air, fuel, or hydrocarbon charging stock supplies will not give rise to explosion hazards or other undesirable operating conditions.

This invention is particularly applicable in a carbon black process wherein a hydrocarbon charging stock is cracked within a reactor or furnace, or a plurality thereof, in the presence of combustion gases resulting from the combustion of a fuel and air. The effluent gas from the reactor, which gas contains carbon black, is conducted through a suitable header to a quench unit and subsequently to cyclone and bag filter units for the recovery of the carbon black from the effluent gas. In a conventional carbon black process, such as that disclosed in U.S. patent to Joseph C. Krejci, 2,641,534, of June 9, 1953, a heavy gas oil or natural gas is preheated in a direct-fired preheater or an indirect heat exchanger installed in the effluent gas or smoke pipe downstream of the carbon black reactor. The hydrocarbon charging stock is thus preheated to a constant predetermined temperature and is then axially fed into the reactor along with process air in the proper proportions. A gaseous combustible mixture, such as a mixture of natural gas and air, is tangentially fed into the reactor so as to heat the hydrocarbon charging stock under partial combustion conditions and crack the same.

The effluent gas from the carbon black reactor contains carbon black suspended in a stream of flue gases which contains substantial quantities of hydrogen, e.g., 12 volume or mol percent, and carbon monoxide, e.g., 12 volume or mol percent, on a dry basis, as well as traces of hydrocarbons. During normal operations of the carbon black plant air for the process is employed but sufficient oxygen is not present in the system to give rise to an undesirable combustible or explosive mixture, since a deficiency of air is employed and substantially all of the oxygen is normally consumed during combustion. However, in the event of a pressure failure within the plant production system, air may enter the reactor, smoke header, quench unit, air lines, etc., due to the reduced pressure in the system and give rise to hazardous operating conditions which may result in explosions due to the presence of combustible or explosive gaseous mixtures which can be ignited through contact with the heated surfaces of equipment. A pressure failure in the system may also be caused by a power failure which, for example, may result in the disabling of the blowers supplying process air to the system.

In addition, a failure in the process air supply will cause combustion gases from the reactor to back up into the air supply header with the result that a further explosion hazard may occur. Failure of process air supply can result in severe coking in the reactor in addition to improper proportions of process air and fuel.

Similarly, interruption or failure of the tangential fuel supply as the result, for example, of low level in the supply tank or mechanical failure, will give rise to undesirable operating conditions, especially where the supply of process air is continued.

Failure in the supply of hydrocarbon charging stock can result in undesirable coking in the preheater tubes since the residual heat in the red-hot refractories of the preheater is generally sufficient to coke a substantial portion of the charging stock. In many cases the coils or tubes in which the charging stock is being preheated have been actually ruined and have required replacement with the consequent measurable increase in the cost of carbon black production.

Manual shut-down of the various supply sources to prevent hazardous conditions from arising have often been unsatisfactory because of the inefficiencies and uncertainties of manual shut-down systems. In addition, employment of manual shut-down systems has attendant difficulties in insuring proper sequence of shut-down operations as well as proper sequence of starting-up operations.

Accordingly, an object of our invention is to provide an improved automatic safety shut-down system for use in a process involving the burning of combustible mixtures.

Another object is to provide an automatic safety shut-down system for use in a carbon black process whereby failures of electric power, process air, fuel, or hydrocarbon charging stock supplies will not give rise to explosion hazards or other undesirable operating conditions.

Another object is to provide an improved safety shut-down system for a carbon black process whereby coking of the hydrocarbon charging stock in the preheater tubes is prevented if a supply failure occurs.

Another object is to provide an improved safety shut-down system for a carbon black process and the like, characterized by reduced maintenance costs, quick and reliable response in the event of process supply failures, and safety.

Further objects and advantages of our invention will become apparent, to those skilled in the art, from the following discussion, appended claims, and the accompanying single drawing which is a flow diagram illustrating the application of our invention in a carbon black process.

Although our invention is particularly applicable in a carbon black process, and the invention will be described hereinafter as applied thereto, it is to be understood that it is not to be unduly limited thereto, but rather is applicable to any process involving the burning of combustible mixtures with or without other reactants.

Our invention comprises an interlocking system of cooperating automatic controls which shuts down and purges a furnace-type carbon black plant or the like in the event of failure of power supply or essential units of operating equipment. In the event of failures in process air, fuel, or electric power, an emergency shut-down operation occurs as follows: steam is admitted to the smoke headers and quench towers; air flow control valves close; motor valves on main air blowers close; fuel flow control valves close; and the hydrocarbon charging stock is caused to by-pass the reactor and be recycled. In addition, a power failure closes the hydrocarbon charging stock flow control valves, closes by-pass control valves on the hydrocarbon charging stock preheater tubes, purges the hydrocarbon charging stock preheater with steam, and starts emergency generators. A failure in the hydrocarbon charging stock supply causes the hydrocarbon charging stock flow control valves to close, the by-pass control valves on the preheater tubes to close, the valves in the feed lines to the reactors to close, the valves in the recycle lines to open, and steam to purge the preheater and feed lines into the recycled header.

Referring now to the accompanying flow diagram, numeral 10 generally designates a carbon black furnace or reactor having an expanded cylindrical section 11 at the feed end and a small elongated cylindrical section 12 directly connected with the expanded section. The elongated cylindrical section 12 is connected to a pipe 13 which functions as an indirect heat exchanger provided with coils or tubes 14 and 14a. Alternatively, a direct-fired heat exchanger can be employed in place of that shown in the flow diagram. Smoke pipe or header 16 is connected to the heat exchanger section 13 and to a quench tower 17. Hydrocarbon charging stock, such as a heavy gas oil or natural gas, is axially supplied to the feed end of the reactor via line 18 together with required axial air under pressure via line 19. Fuel, such as natural gas, is supplied under pressure by line 20 to the reactor via lines 21 and 22 together with process air under pressure via lines 23, 24, and 26 in the form of a combustible mixture which is tangentially introduced to the reactor 10. A water line 27 having a flow control valve therein feeds water to a spray head in the outlet end of the furnace or, if desired, into the elongated cylindrical section 12 to quench the reaction. Further cooling of the reactor effluent is effected in enlarged cylindrical section 12 by radiation and convection to the atmosphere or by means of an external jacket (not shown) with suitable cooling fluid. The reactor effluent preheats hydrocarbon charging stock flowing in preheater coils 14 and 14a and subsequently passes into the smoke header 16 where it can be mixed with effluent from other reactors (not shown), the reactor effluent then passing into the quench tower 17 wherein quench water is supplied via line 28 which is provided with a flow control valve. Gases containing suspended carbon black are withdrawn from the quench tower 17 via line 29 and conducted to suitable carbon black recovery equipment. Condensate is withdrawn from the quench tower via line 31 which is provided with a flow control valve.

Hydrocarbon charging stock is pumped from storage (not shown) into header 32 which can be provided with branch lines for feed to and return from reactors in a manner hereinafter to be described. Charging stock is fed to the reactor 10 from the header 32 via line 33. The flow in line 33 can be controlled by a motor valve 34, which can be supplied with controlled instrument air pressure from flow controller 36 and three-way solenoid-actuated valve 37. Flow controller 36 can be actuated by a measurement of the flow rate in line 33 by an orifice meter 38. Solenoid-actuated valve 37 is installed so that when the solenoid is not energized, for example, as the result of a power failure, the air pressure is removed from valve 34 and bleeds to the atmosphere, thus closing valve 34.

Steam, or other inert purge gas such as nitrogen, etc., is admitted to line 33 through line 39, controlled by motor valve 41. Solenoid-actuated valve 42, when energized, allows instrument air to be applied to valve 41, holding it closed. When the solenoid is de-energized, air is bled from valve 41 to the atmosphere, thus opening valve 41 and allowing the passage of purge steam to line 33.

The hydrocarbon charging stock flowing in line 33 can be preheated by passing through coils 14 and 14a, the charging stock then flowing into line 43. Alternatively, all of the hydrocarbon charging stock need not be conducted to a preheater but fed directly to the reactor. The temperature in line 43 can be applied to a temperature controller 44 which supplies controlled air pressure through solenoid-actuated valve 46 to motor valve 47 which can control the flow of charging stock in the preheater by-pass line 48. Line 48 is shown as by-passing a portion of the preheater, but it is obvious that the by-pass could be around the entire preheater. If the power is removed from solenoid-actuated valve 46, the air pressure is bled from valve 47, thus closing the latter.

Hydrocarbon charging stock passes from line 43 either to line 18 for feed to the reactor 10 or to line 49 for recycle to the header 32, according to the positions of motor valves 51 and 52. Instrument air pressure is applied to these valves from solenoid-actuated valve 53. If solenoid-actuated valve 53 becomes de-energized, air is removed from valves 51 and 52, causing valve 51 to close and valve 52 to open, thus causing the charging stock in line 43 to recycle through line 49.

The pressure in header 32 is measured and applied to pressure controller 54 which proportionally supplies air pressure to motor valve 56 and pressure-actuated switch 57. In the event of a failure of charging stock flow, the pressure in header 32 will fall below a predetermined value and pressure controller 54 will cause valve 56 to close and switch 57 to open, thus removing electric power from the line supplying solenoid-actuated valves 42, 37 and 46. Opening of switch 57 also causes relay coil 58 to de-energize, allowing switch 59 to open and thus de-energizing solenoid-actuated valve 53. Manual reset switch 61 is provided so that when electric power is restored through the closing of switch 57, a manual reset is required.

Relay coil 58 and switch 59 are provided so that upon start-up of the process after a failure, an incorrect sequence of operations cannot take place. It is thus apparent that the opening of switch 57 will cause all charging stock valves to close except recycle valve 52, which valve opens, and can also cause purge steam to enter the charging stock line 33 upstream from the preheater.

Tangential fuel, for example, oil or natural gas, flows from storage (not shown) into header 62 which can be provided with suitable branch lines (not shown) to other reactors. Flow of tangential fuel in line 20, which feeds fuel to reactor, can be controlled by motor valve 63, solenoid-actuated valve 64, flow controller 66, and orifice meter 67. If solenoid-actuated valve 64 is de-energized, air is bled from valve 63, thus closing it.

The pressure in tangential fuel header 62 is measured and applied to pressure controller 68 which proportionally supplies air pressure to motor valve 69 and pressure switches 71 and 72. Controller 68 is set so as to tend to maintain a constant superatmospheric pressure in header 62. In the event of a failure of tangential fuel supply in header 62, the pressure will fall below a predetermined value, causing pressure controller 68 to close valve 69 and open switches 71 and 72. This will remove electric power from the circuits supplied by these switches as shown in the flow diagram.

Air for the process is supplied to header 73 by blower 74 which is supplied with electric power through pressure switch 72. Motor valve 76 in header 73, immediately downstream from blower 74, is held open by a supply of instrument air through solenoid-actuated valve 77. In the event of solenoid-actuated valve 77 being de-energized (for example, by the opening of switch 71), the air pressure on valve 76 is bled off, thus closing it. Thus, should an explosion occur in the header 73, the blower 74 will not be damaged, even if valve 82 fails. The flow of air to the reactor 10 via line 23 can be controlled by orifice meter 78, flow controller 79, solenoid-actuated valve 81, and motor valve 82. If solenoid-actuated valve 81 is de-energized, valve 82 will close. The pressure in air supply header 73 can be set by control of the position of valve 83 in vent line 84 through the action of pressure controller 86. If pressure in header 73 falls below a predetermined value, pressure controller 86 will close valve 83 and open switch 87. Controller 86 is set so as to maintain a constant superatmospheric pressure in header 73.

Purge steam is admitted to the smoke header 16 and/or quench tower 17 through lines 88 and 89, according to the position of motor valve 91 in line 92. Solenoid-actuated valve 93 supplies instrument air to valve 91 and is so installed that when the solenoid is de-energized, air bleeds off valve 91 and opens it.

Manual reset switches 94, 95, 96, 97, 98, 99, and 101 are similar in operation to switch 61 hereinbefore described and can be magnetic switches, or push-button stations. Following a shut-down, manual reset of these switches is required before current will flow.

Switch 102 can control the flow of current to suitable relays (not shown) for starting of an emergency generator, in a manner well known to those skilled in the art. When power fails, the emergency generator is started up. This emergency generator will be of sufficient size to provide emergency power for lights, instruments, and the like. Such a generator can also be of sufficient size so as to permit the supply of tangential fuel and air to one or two reactors of a multi-reactor plant. In this manner, a supply of hot non-combustion gas can be generated within the system, thus avoiding problems of condensation within the smoke header 16 and quench tower 17, and the carbon black recovery equipment.

The controllers shown schematically on the flow diagram are supplied with a source of instrument air (not shown). Furthermore, it will be obvious that when additional reactors are used, certain of the controllers will be common to the process and need not be duplicated. The controllers which must be duplicated for each reactor 36, 44, 66 and 79; manual reset switches 61, 97, 98, 99 and 101, and relay coil 58 with relay switch 59 must also be duplicated.

Suitable pressure switches which can be employed in the safety system described hereinabove include, for example, diaphragm pressure switches having a pair of snap-action contacts which come into junction when a predetermined pressure exists and break contact when a predetermined low pressure exists; pressure switches of the mercury bulb contact type having a pressure sensing element, can also be employed.

The following table shows the condition of all process control valves, the emergency generator, and the air blower during normal plant operations and during emergency shut-down conditions caused by power failure, hydrocarbon charging stock failure, tangential fuel failure, and process air failure.

pressure in each of said first conduits, a recycle conduit communicating between said source and that said first conduit supplying said charging stock at a first point therein, a first valve in said recycle conduit, and a second valve in that said first conduit supplying said charging stock at a point downstream of said first point, said first and second valves controlled by said sensing means whereby said first valve is opened and said second valve is closed when the pressure in any of said first conduits falls below a predetermined value.

2. In a system for producing carbon black including a reactor, first conduits for supplying to said reactor a hydrocarbon charging stock from a source thereof, fuel under pressure, and air under pressure, and a second conduit for conveying reaction products from said reactor to carbon black recovery equipment, a safety system comprising: sensing means responsive to pressure in each of said first conduits; a recycle conduit communicating between said source of charging stock and that said first conduit supplying said charging stock at a first point therein; a first valve in said recycle conduit; a second valve in that first conduit supplying said charging stock at a point downstream of said first point, said first valve and said second valve controlled by said sensing means whereby said first valve is opened and said second valve is closed when the pressure in any one of said first conduits falls below a predetermined value; a third conduit for supplying a purge gas to said second conduit, said third conduit having a third valve therein; and fourth and fifth valves in those first conduits supplying said fuel and air respectively, said third, fourth, and fifth valves controlled by said sensing means whereby a fall in pressure below a predetermined value in either of the last-mentioned first conduits opens said third valve and closes said fourth and fifth valves.

3. In a system for producing carbon black including a reactor, a source of hydrocarbon charging stock, a first conduit for supplying said charging stock from said source to said reactor, second and third conduits for respectively supplying fuel and air under pressure to said reactor, and a fourth conduit for conveying reaction products from said reactor to carbon black recovery equipment, a safety system comprising a fifth conduit communicating between a first point in said first conduit Table

| Condition Controlled | Item No. | Normal plant operation | Electric power failure | Charging stock failure | Tangential fuel failure | Air failure |
|---|---|---|---|---|---|---|
| Charging stock to preheater | 34 | open | closed | closed | open | open. |
| Preheater purge | 41 | closed | open | open | closed | closed. |
| Preheater by-pass | 47 | open | closed | closed | open | open. |
| Charging stock to reactor | 51 | ---do--- | ---do--- | ---do--- | closed | closed. |
| Charging stock by-pass | 52 | closed | open | open | open | open. |
| Charging stock header | 56 | open | closed | closed | ---do--- | Do. |
| Tangential fuel to reactor | 63 | ---do--- | ---do--- | open | closed | closed. |
| Tangential fuel header | 69 | ---do--- | ---do--- | ---do--- | ---do--- | open. |
| Air header | 76 | ---do--- | ---do--- | ---do--- | ---do--- | closed. |
| Air to reactor | 82 | ---do--- | ---do--- | ---do--- | ---do--- | Do. |
| Air header vent | 83 | ---do--- | ---do--- | ---do--- | ---do--- | Do. |
| Heater and quench purge | 91 | closed | open | closed | open | open. |
| Emergency generator | | off | on | off | off | off. |
| Air blower | 74 | on | off | on | ---do--- | Do. |

Various modifications and alterations of our invention will become apparent, to those skilled in the art, without departing from the scope and spirit of the invention, and it is to be understood that our invention is not to be unduly limited to the foregoing discussion and drawing, which sets forth a preferred embodiment of our invention.

We claim:

1. In a system for burning a combustible gaseous mixture including a reactor, first conduits for supplying to said reactor a hydrocarbon charging stock from a source thereof, fuel under pressure, and air under pressure, a safety system comprising sensing means responsive to and said source of charging stock; a first valve in said first conduit at a point downstream from said first point; a second valve in said fifth conduit; a sixth conduit for supplying steam to said fourth conduit; third, fourth, and fifth valves in said second, third, and sixth conduits respectively; and means in each of said first, second and third conduits responsive to pressure therein, each of said means adapted to control said first and second valves whereby said first valve is closed and said second valve is opened when the pressure in any one of said first, second, and third conduits falls below a predetermined value; said means in said second and third conduits adapted to control said third, fourth, and fifth valves whereby said third and fourth valves close and said fifth valve opens when the pressure in one of said second and third conduits falls below a predetermined value.

4. In a system for producing carbon black including a reactor, a source of hydrocarbon charging stock, a first conduit for supplying said charging stock from said source to said reactor, second and third conduits for respectively supplying fuel and air under pressure to said reactor, and a fourth conduit for conveying reaction products from said reactor to carbon black recovery equipment, a safety system comprising: a source of current; a fifth conduit communicating between a first point in said first conduit and said source of charging stock; a first valve in said first conduit at a point downstream from said first point; a second valve in said fifth conduit; a sixth conduit for supplying steam to said fourth conduit; third, fourth and fifth valves in said second, third, and sixth conduits respectively; and first means in each of said first, second, and third conduits responsive to pressure therein, each of said first means including an electrically-operated valve-actuating means, each of the latter adapted to control said first and second valves whereby said first valve is closed and said second valve is opened when the pressure in any one of said first, second, and third conduits falls below a predetermined value; said valve-actuating means of those first means in said second and third conduits adapted to control said third, fourth and fifth valves whereby said third and fourth valves close and said fifth valve opens when the pressure in one of said second and third conduits falls below a predetermined value; said valve-actuating means supplied by current from said source of current.

5. In a system according to claim 4 further including an electrically-powered blower means in said third conduit, and wherein said first means in said second and third conduits are adapted to control current from said source of current to said blower means.

6. In a system according to claim 4 wherein each of said first means further comprises a pressure switch operatively connected to said electrically-operated valve-actuating means and said source of current.

7. In a system according to claim 5 wherein said safety system further comprises a sixth valve in said third conduit at a point downstream from said blower means and upstream of said fourth valve, said sixth valve controlled by said valve-actuating means of those first means in said second and third conduits and adapted to close said sixth valve when the pressure in one of said second and third conduits falls below a predetermined value.

8. In a system for producing carbon black including a reactor, a source of hydrocarbon charging stock, a first conduit for conducting said charging stock to a preheater, a second conduit for supplying the preheated charging stock to said reactor, third and fourth conduits for respectively supplying fuel and air under pressure to said reactor, and a fifth conduit for conveying reaction products from said reactor to carbon black recovery equipment, a safety system comprising: a sixth conduit communicating between a first point in said second conduit and said source of charging stock; a seventh conduit communicating with said first conduit at a second point for supplying steam thereto; an eighth conduit for supplying steam to said fifth conduit; a first valve in said second conduit at a point downstream from said first point; a second valve in said first conduit at a point upstream from said second point; third, fourth, fifth, sixth, and seventh valves in said third, fourth, sixth, seventh, and eighth conduits respectively; means in each of said third and fourth conduits and any one of said first and second conduits responsive to pressure therein, said means adapted to control said first and fifth valves whereby said first valve is closed and said fifth valve is opened when the pressure in any one of said first, second, third and fourth conduits falls below a predetermined value; said means in any one of said first and second conduits also adapted to control said second and sixth valves whereby said second valve closes and said sixth valve opens when the pressure in any of said first and second conduits falls below a predetermined value; said means in said third and fourth conduits adapted to control said third, fourth, and seventh valves whereby said third and fourth valves close and said seventh valve opens when the pressure in any one of said third and fourth conduits falls below a predetermined value.

9. In a system for producing carbon black including a reactor, a source of hydrocarbon charging stock, a preheater having a preheating tube therein, a first conduit for conducting said charging stock from said source of charging stock to said preheating tube, said first conduit having a branch conduit for conducting said charging stock to only a portion of said preheating tube, a second conduit for supplying preheated charging stock from said preheater to said reactor, third and fourth conduits for respectively supplying fuel and air under pressure to said reactor, and a fifth conduit for conveying reaction products from said reactor to carbon black recovery equipment, a safety system comprising: a sixth conduit communicating between a first point in said second conduit and said source of charging stock; a seventh conduit communicating with said first conduit at a second point for supplying steam thereto; an eighth conduit for supplying steam to said fifth conduit; a first valve in said second conduit at a point downstream from said first point; a second valve in said first conduit at a point upstream from said second point; third, fourth, fifth, sixth, and seventh valves in said third, fourth, sixth, seventh, and eighth conduits respectively; a ninth valve in said branch conduit; pressure responsive means in each of said third and fourth conduits and any one of said first and second conduits, said means adapted to control said first and fifth valves whereby said first valve closes and said fifth valve opens when the pressure in any one of said first, second, third, and fourth conduits falls below a predetermined value; said means in any one of said first and second conduits also adapted to close said second and ninth valves and open said sixth valve when the pressure in any one of said first and second conduits falls below a predetermined value; said means in said third and fourth conduits adapted to close said third and fourth valves and open said seventh valve when the pressure in any one of said third and fourth conduits falls below a predetermined value.

10. In a system for producing carbon black including a source of hydrocarbon charging stock, a preheater having a preheating tube, a first conduit for conducting said charging stock from said source of charging stock to said preheating tube, said first conduit having a branch conduit for conducting said charging stock to only a portion of said preheating tube, a second conduit for supplying preheated charging stock from said preheater to said reactor, a third conduit for supplying fuel under pressure to said reactor, a fourth conduit having electrically-powered blower means therein for supplying air under pressure to said reactor, a current source for said blower means, and a fifth conduit for conveying reaction products from said reactor to carbon black recovery equipment, a safety system comprising: a sixth conduit communicating between a first point in said second conduit and said source of charging stock; a seventh conduit communicating with said first conduit at a second point for supplying steam thereto; an eighth conduit for supplying steam to said fifth conduit; a first valve in said second conduit at a point downstream from said first point; a second valve in said first conduit at a point upstream from said second point; third, fourth, fifth, sixth, and seventh valves in said third, fourth, sixth, seventh, and eighth conduits respectively; a ninth valve in said branch conduit; first means in each of said third and fourth conduits and any one of said first and second conduits responsive to pressure therein; said first means including a pressure switch and an electrically-operated valve-actuating means, each of the latter adapted to close said first valve and open said fifth valve when the pressure in any of said third and fourth conduits and any one of said first and second conduits falls below a predetermined value; said valve-actuating means of that first means responsive to pressure in any of said first and second conduits also adapted to close said second and ninth valves and open said sixth valve when the pressure in any one of said first and second conduits falls below a predetermined value; said valve-actuating means of those first means responsive to pressure in any one of said third and fourth conduits also adapted to close said third and fourth valves and open said seventh valve when the pressure in any one of third and fourth conduits falls below a predetermined value; said pressure switches of those first means in said third and fourth conduits adapted to control the supply of current to said blower means from said current source and stop same when the pressure in any of said third and fourth conduits falls below a predetermined value; said valve-actuating means supplied by current from said current source.

11. In a system according to claim 10 wherein said safety means further comprises a tenth valve in said fourth conduit at a point downstream of said blower means and upstream of said fourth valve, said tenth valve controlled by said valve-actuating means of those first means in said third and fourth conduits and adapted to close said tenth valve when the pressure in one of said third and fourth conduits falls below a predetermined value.

12. In a system for producing carbon black including a source of hydrocarbon charging stock, a reactor, a first conduit for supplying said charging stock to said reactor, and a second conduit for conveying reaction products from said reactor to carbon black recovery equipment, a safety system comprising: a third conduit communicating between a point in said first conduit and said source of charging stock; sensing means responsive to pressure in said first conduit; a first valve in said first conduit at a point downstream from said point; and a second valve in said third conduit; said first and second valves controlled by said sensing means whereby a drop in pressure in said first conduit below a predetermined value opens said second valve and closes said first valve.

13. In a system for producing carbon black including a source of hydrocarbon charging stock, a reactor, a first conduit for conducting said charging stock to a preheater, a second conduit for supplying the preheated charging stock to said reactor, and a third conduit for conveying reaction products from said reactor to carbon black recovery equipment, a safety system comprising: a fourth conduit communicating between a first point in said second conduit and said source of charging stock; a fifth conduit communicating with said first conduit at a second point for supplying steam to said first conduit; a first valve in said first conduit upstream from said second point; a second valve in said second conduit at a point downstream from said first point; a third valve in said fourth conduit; a fourth valve in said fifth conduit; and sensing means in either of said first and second conduits responsive to pressure therein; said first, second, third and fourth valves controlled by said sensing means whereby said first and second valves close and said third and fourth valves open when the pressure in either of said first and second conduits falls below a predetermined value.

14. In a system for producing carbon black including a source of charging stock, a reactor, a first conduit for conducting said charging stock to said reactor, second and third conduits for respectively supplying fuel and air under pressure to said reactor, and a fourth conduit for conveying reaction products from said reactor to carbon black recovery equipment, a safety system comprising: sensing means responsive to pressure in said first, second and third conduits; a fifth conduit communicating between said source of charging stock and said first conduit at a first point therein; a first valve in said first conduit at a point downstream of said first point; a second valve in one of said second and third conduits; and a third valve in said fifth conduit; said first, second, and third valves controlled by said sensing means whereby said first valve closes and said third valve opens when the pressure in any of said first, second, and third conduits drops below a predetermined value, and said second valve closes when the pressure in the other of said second and third conduits drops below a predetermined value.

15. In a system for producing carbon black including a source of hydrocarbon charging stock, a reactor, a first conduit for conducting said charging stock to said reactor, second and third conduits for respectively supplying fuel and air under pressure to said reactor, and a fourth conduit for conveying reaction products from said reactor to carbon black recovery equipment, a safety system comprising: a fifth conduit communicating between a first point in said first conduit and said source of charging stock; a sixth conduit for supplying steam to said fourth conduit; first sensing means in said first conduit responsive to pressure therein; a first valve in said first conduit at a point downstream from said first point; a second valve in said fifth conduit; second sensing means responsive to pressure in said second and third conduits; and third, fourth, and fifth valves in said second, third, and sixth conduits respectively; said second sensing means adapted to control said third, fourth and fifth valves whereby said third and fourth valves close and said fifth valve opens when the pressure in either of said second and third conduits drops below a predetermined value.

16. In a system for producing carbon black including a source of hydrocarbon charging stock, a reactor, a first conduit for supplying said reactor with said charging stock, second and third conduits for respectively supplying fuel and air under pressure to said reactor, and a fourth conduit for conveying reaction products from said reactor to carbon black recovery equipment, a safety system comprising: a fifth conduit for supplying steam to said fourth conduit; a sixth conduit communicating between said source of charging stock and said first conduit at a first point therein; sensing means responsive to the pressure in said second and third conduits; and first, second, third, and fourth valves in said second, third, fifth, and sixth conduits respectively; said sensing means adapted to control said valves whereby said first and second valves close and said third and fourth valves open when the pressure in either of said second and third conduits drops below a predetermined value.

17. In a system for producing carbon black including a source of hydrocarbon charging stock, a reactor, a first conduit for supplying said charging stock to said reactor, second and third conduits for respectively supplying fuel and air under pressure to said reactor, and a fourth conduit for conveying reaction products from said reactor to carbon black recovery equipment, a safety system comprising: a fifth conduit communicating between said first conduit at a first point therein and said source of charging stock; a sixth conduit for supplying steam to said fourth conduit; a first valve in said first conduit at a point downstream from said first point; second, third, fourth and fifth valves in said second, third, fifth, and sixth conduits respectively; electrically-operated valve-actuating means controlling said valves; and an electric power source adapted to supply electric power to said valve-actuating means; said valve-actuating means adapted to close said first, second, and third valves and open said fourth and fifth valves when said electric power source fails.

References Cited in the file of this patent

UNITED STATES PATENTS 2,785,960     Ribble et al. _____ Mar. 19, 1957